United States Patent
Pettinaroli et al.

(10) Patent No.: US 7,762,280 B2
(45) Date of Patent: Jul. 27, 2010

(54) VALVE FOR TANKLESS WATER HEATER

(75) Inventors: Giulio Pettinaroli, Novarra (IT); Sergio Anchisi, Novarra (IT)

(73) Assignee: Jomar International Ltd., Warren, MI (US)

( * ) Notice: Subject to any disclaimer, the term of this patent is extended or adjusted under 35 U.S.C. 154(b) by 700 days.

(21) Appl. No.: 11/737,894

(22) Filed: Apr. 20, 2007

(65) Prior Publication Data

US 2008/0258092 A1    Oct. 23, 2008

(51) Int. Cl.
*F16K 11/087* (2006.01)
*F24H 1/12* (2006.01)

(52) U.S. Cl. .................... 137/625.47; 122/13.3; 237/56

(58) Field of Classification Search ............ 137/625.22, 137/625.24, 625.47; 122/13.01, 13.3, 14.3, 122/14.31; 237/8 R, 8 A, 8 D, 56
See application file for complete search history.

(56) References Cited

U.S. PATENT DOCUMENTS

| | | | | |
|---|---|---|---|---|
| 3,627,203 | A * | 12/1971 | Martin | ......................... 237/63 |
| 4,089,345 | A | 5/1978 | Eberhardt | |
| 4,103,868 | A | 8/1978 | Thompson | |
| 4,206,904 | A | 6/1980 | Dante | |
| 4,479,459 | A | 10/1984 | Piper | |
| 4,573,498 | A * | 3/1986 | Ludwig | ................... 137/625.47 |
| 4,921,598 | A * | 5/1990 | Desch | ......................... 210/136 |
| 5,632,300 | A | 5/1997 | Isringhausen | |
| 5,988,220 | A * | 11/1999 | Sakaki | ................... 137/625.47 |
| 5,996,613 | A | 12/1999 | Bertolotti | |
| 6,296,229 | B1 | 10/2001 | Giacomini | |
| 6,401,754 | B1 * | 6/2002 | Winquist et al. | ....... 137/625.47 |
| 6,446,667 | B1 * | 9/2002 | Wang | ..................... 137/625.22 |

(Continued)

FOREIGN PATENT DOCUMENTS

| | | |
|---|---|---|
| WO | WO03/001092 | 1/2003 |
| WO | WO2005/005872 | 1/2005 |
| WO | WO2005/031200 | 4/2005 |

OTHER PUBLICATIONS

Installation Instructions Model PB-56 Purge and Balancing Valve, Watts Regulator Co., 2000, 1 page, www.wattscda.com.

(Continued)

*Primary Examiner*—John Fox
(74) *Attorney, Agent, or Firm*—Brooks Kushman P.C.

(57) ABSTRACT

A valve assembly is provided having two valve sections, each having a tubular passageway portion and when joined together, defining a ball cavity in communication with the tubular passageways. One of the body sections is provided with an inlet/outlet in communication with the ball cavity as well as a spindle flange. An elongate spindle extends through the spindle flange projecting into the ball cavity region to rotate a spherical ball element between an open and a bypass position. The ball valve has a primary elongate passage which interconnects the two tubular passage portions in the valve body sections when the ball valve is in the open position. When the ball valve is rotated to the bypass position, the tubular passage portion of one of the ball body sections is sealed closed while the other tubular passage portion communicates with an internal bypass port within the ball valve which in turn, communicates with the auxiliary inlet/outlet. The preferred embodiment includes a pair of valve assemblies for use with a tankless hot water heater system.

5 Claims, 6 Drawing Sheets

U.S. PATENT DOCUMENTS

| | | |
|---|---|---|
| 6,655,412 B2 | 12/2003 | Reck |
| 6,675,834 B1 * | 1/2004 | Lai ........................ 137/625.47 |
| 6,779,561 B2 | 8/2004 | Reck |
| 7,089,960 B2 * | 8/2006 | Maruta .................. 137/625.22 |
| 2002/0195153 A1 | 12/2002 | Reck |
| 2004/0089356 A1 | 5/2004 | Reck |
| 2004/0244855 A1 | 12/2004 | Reck |
| 2006/0169324 A1 | 8/2006 | Cimberio |

OTHER PUBLICATIONS

Series PIPF, Isolation Pump Flanges with Purge Port & Swivel Flange, Watts Regulator Company, 2005, 2 pages, www.wattscanada.ca.

Dielectric Isolation Valve, Grundfos Deilectric Isolation Valve, L-ACS-SL-01 Nov. 2005 (US), 2 pages, www.grundfos.com.

Tankless Water Heater Valves, cim 460, valve cimberio, Feb. 2006, 2 pages, www.cimberiovalve.com.

* cited by examiner

_Fig. 13_

US 7,762,280 B2

VALVE FOR TANKLESS WATER HEATER

BACKGROUND OF THE INVENTION

1. Field of the Invention

The present invention relates to liquid shut-off valves and in particular, shut-off valves for use with a tankless water heater.

2. Background Art

Tankless water heaters are a class of water heaters which have minimal reservoir volume and heat hot water on demand when needed. Tankless water heaters are frequently located near the point of use in order to minimize the volume of water between the water heater and the point of use which typically goes to waste after hot water use is terminated. Further energy savings occurs due to the fact that the water is only heated on demand therefore there is no large hot water reservoir constantly leaking heat to the environment even during long periods of inactivity.

Due to the small liquid volume within a tankless hot water heater, it is frequently necessary to periodically drain and flush the tankless water heater to prevent or eliminate scale build up.

Figure 1:
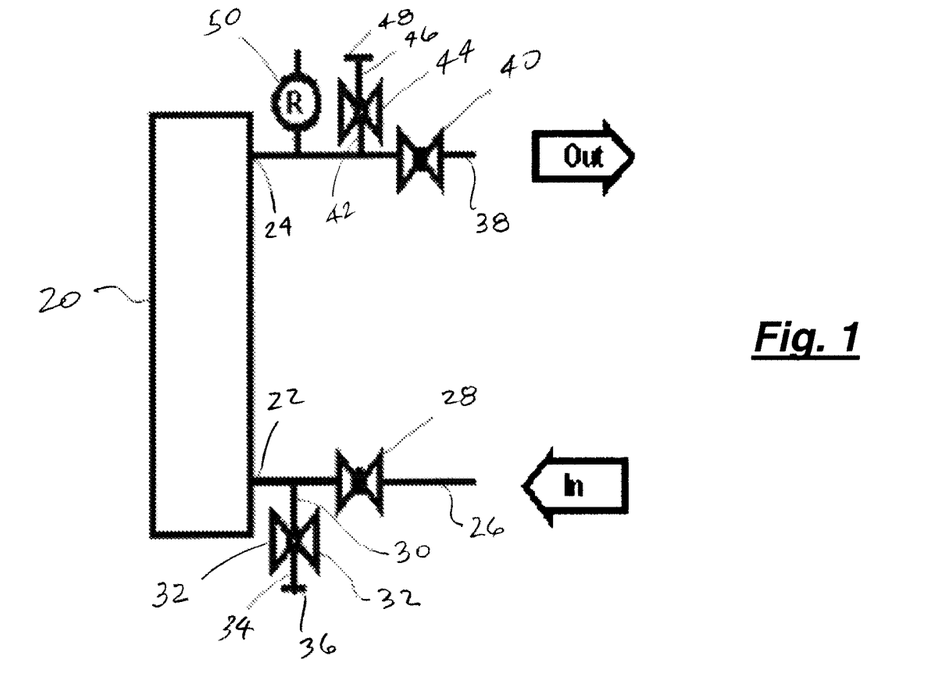
FIG. 1 is a schematic illustration of the prior art installation of a tankless hot water heater.

FIG. 1 illustrates a common plumbing installation for tankless water heater 20 which has a cold water inlet 22 and a hot water outlet 24. Tankless hot water heater 20 will be provided typically with an internal electric heating element (not shown), heating an internal conduit extending between inlet 22 and outlet 24. Cold water comes into the system via cold water inlet pipe 26 passing through a first shut off valve 28 which is typically a ¼ turn ball valve having an open and close position. Valve 28 of course can have other valve constructions such as that of a gate valve or the like. Interposed between valve 28 and cold water inlet 22 is a T-branch connection 30 coupled to an auxiliary inlet/outlet valve 32. Valve 32 is provided with an inlet/outlet 34 which is normally closed by cap 36. In normal use, valve 28 is open and valve 32 is closed.

The hot water outlet 24 of tankless water heater 20 is connected to a hot water outlet pipe 38 by a fluid line having a shut off valve 40 which is preferably, a ¼ turn ball valve, but alternatively, can be a gate valve or the like. Between shut off valve 40 and the hot water outlet, a T-branch connection 42 is provided for mounting an auxiliary shut off valve 44 having an inlet/outlet 46 removably closed by cap 48. Ideally, a pressure relief valve 50 is provided in the system to let hot water escape in the event an extremely high pressure condition occurs. In normal operation, water flows through tankless water heater 20 in the direction of the in and out arrows illustrated in FIG. 1. When one desires to flush the system, valves 28 and 40 are closed and, valves 32 and 44 are opened. Caps 36 and 48 are removed from outlets 34 and 46 so the system may be drained and water or other flushing fluid run through the heater to remove scale build up. While the system of valves illustrated in FIG. 1 functions satisfactorily, the valves are relatively expensive and occupy a fair amount of space.

An object of the present of invention is to make a low cost valve assembly for use with a tankless water heater. It is further an object of the present invention to provide a very compact valve system so that the tankless water heater can be mounted in a tight space.

SUMMARY OF THE INVENTION

A valve assembly is provided having a valve body formed of at least two sections, each having a tubular passageway portion and when joined together, defining a ball cavity in communication with the tubular passageways. One of the body sections is provided with an inlet/outlet in communication with the ball cavity as well as a spindle flange. An elongate spindle extends through the spindle flange projecting into the ball cavity region. A spherical ball element is oriented within the ball cavity and is rotatably driven by the spindle between an open and a bypass position. The ball valve has a primary elongate passage which interconnects the two tubular passage portions in the valve body sections when the ball valve is in the open position. When the ball valve is rotated to the bypass position, the tubular passage portion of one of the ball body sections is sealed closed while the other tubular passage portion communicates with an internal bypass port within the ball valve which in turn, communicates with the auxiliary inlet/outlet. The preferred embodiment includes a pair of valve assemblies for use with a tankless hot water heater having a cold water inlet and hot water outlet.

DETAILED DESCRIPTION OF THE PREFERRED EMBODIMENT(S)

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to utilize the present invention.

Figure 2:
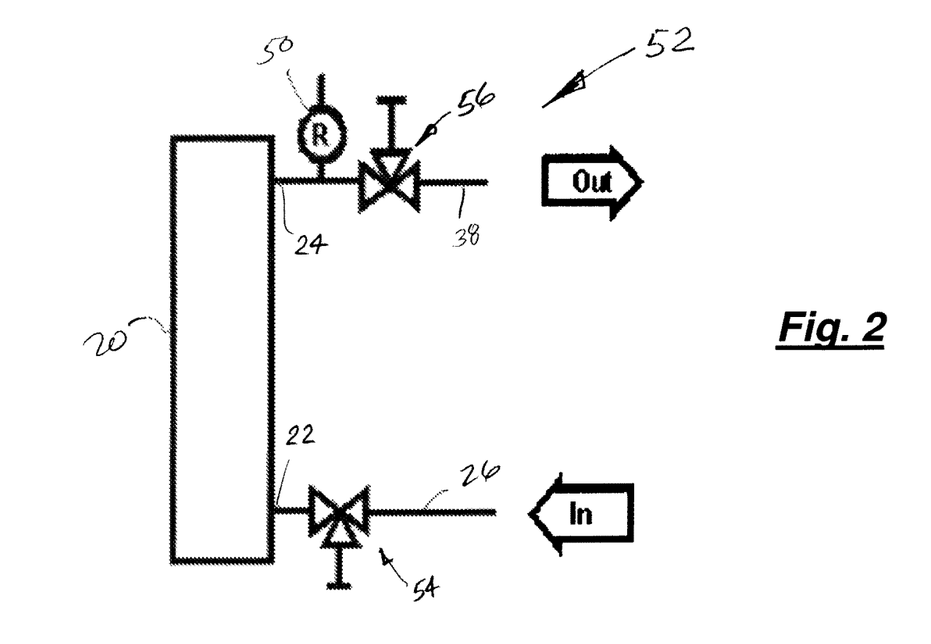
FIG. 2 is a schematic illustration of the valves of the present invention installed in a tankless water heater system.

FIG. 2 illustrates a tankless water heater system 52 which includes a tankless water heater 20 having a water inlet 22 and a hot water outlet 24. Cold water enters the system through a cold water inlet pipe 26 which is connected to the cold water inlet 22 by an inlet valve assembly 54 of the present invention. Water exiting the tankless hot water heater 20 through outlet 24 passes through outlet valve assembly 56 which is connected to outlet pipe 38. The single inlet valve and the single outlet valve of the present invention each replace two separate valves and interconnecting plumbing which are shown in FIG. 1 and described above. The inlet and outlet valves 54 and 56 of the present invention have significantly fewer parts having a single rotary ball and therefore occupy substantially less space than prior art systems.

Figure 3:
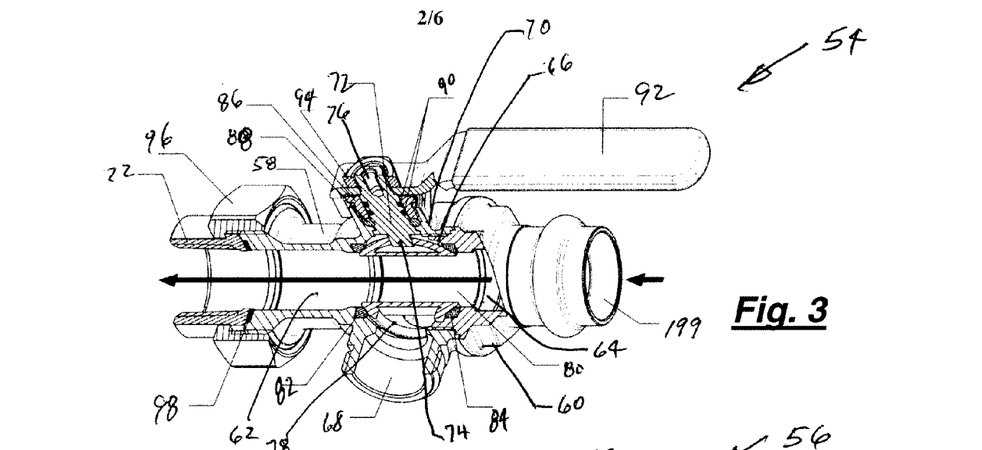
FIG. 3 is a partially cutaway perspective view of an inlet valve assembly of the present invention.
Figure 8:
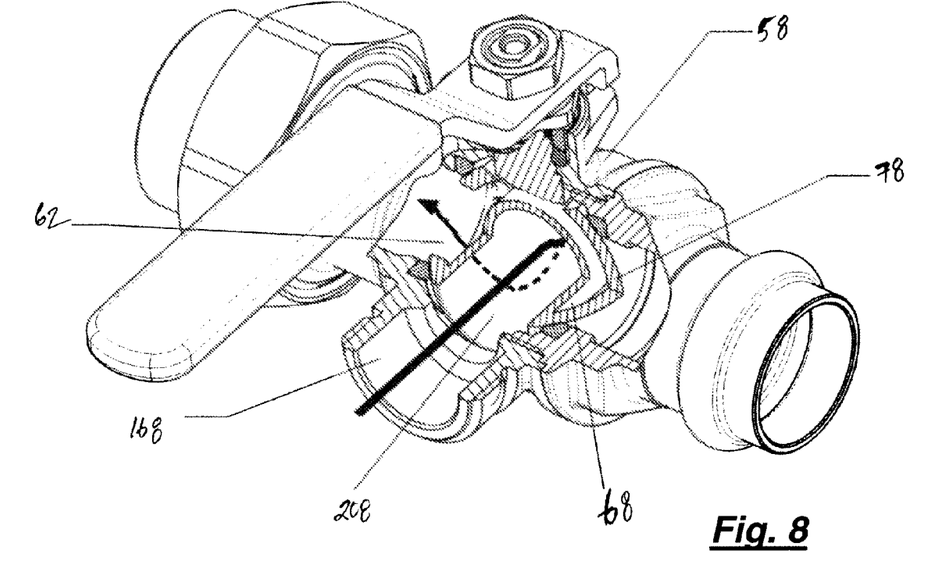
FIG. 8 is a partially cutaway perspective view of the inlet valve assembly in the bypass position.
Figure 9:
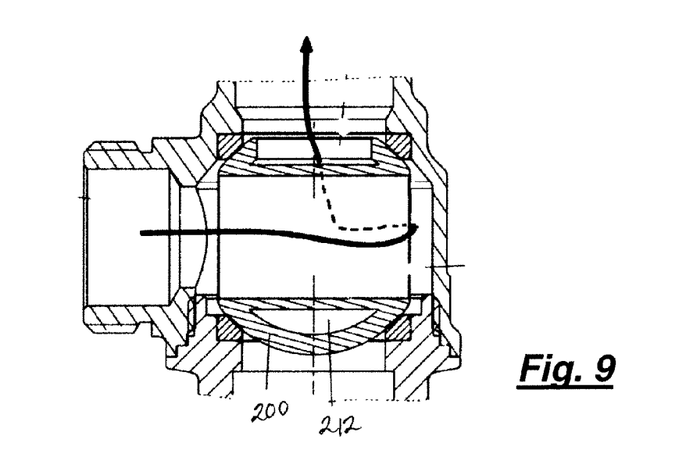
FIG. 9 is a cross-sectional side elevational section view of the inlet valve in the bypass position.

Inlet valve assembly 54 is illustrated in greater detail in FIGS. 3, 8 and 9. Outlet valve 56 is shown in greater detail in FIGS. 4, 10 and 11. Referring to FIG. 3, inlet valve assembly 54 comprises a valve body formed of at least two body sections, first body section 58 and second body section 60 which respectfully have an elongate tubular passageway portions 62 and 64 extending therethrough. In this preferred embodiment, the elongate tubular passageway portions 62 and 64 are coaxially aligned along a longitudinal axis shown by flow directional arrows in FIG. 3. Body sections 58 and 60, when joined together, define an enclosed ball cavity 66 therebetween, which communicates with elongate tubular passageway portions 62 and 64. One of the two body sections, in the embodiment illustrated the first body section 58, is provided with an auxiliary inlet/outlet 68 which communicates with the ball cavity 66. The first body section further defines a tubular spindle flange 70 which also communicates with ball cavity 66.

The inlet valve assembly 54 is provided with an elongate spindle 72 which is coaxially mounted within spindle flange 70 for limited rotation between an open position shown in FIG. 3 and a bypass position shown in FIG. 8. Spindle 72 has a first end 74 extending into the ball cavity 66 and a second end 76 external from the ball cavity. A generally spherical ball valve 78 is oriented within ball cavity 66 trapped between the first and second body sections 58 and 60. Ball valve 78 is provided with a notch for receiving a non-cylindrical first end of the spindle 74 therein so that the spindle and ball valve rotate in unison about the spindle axis. The ball valve is provided with a primary elongate passage 80 which extends therethrough which is aligned with first and second tubular passage portions 62 and 64 as shown in FIG. 3 when the ball valve 66 is oriented in the open position. In the open position, fluid may flow straight through the valve with minimal flow resistance. Annular seals 82 and 84 are oriented in first body sections 58 and 60 at the intersection of a first tubular passage portion 62 and a second tubular passage portion 64 and ball cavity 66. First and second annular seals 82 and 84 sealingly cooperate with the outer peripheral spherical surface of the ball valve 78 immediately outboard of the primary elongate passageway 80 to provide a fluid tight connection.

Spindle 72 is held within tubular spindle flange 70 by a packing gland 86 which threadlingly cooperates with the tubular spindle flange and further cooperates with an O-ring seal 88 at the axial end of the packing gland and a pair of annular spindle seals 90 which fit into machined grooves in the spindle. Preferably, the second end of the spindle 72 has a non-circular outer periphery to cooperate with a similarly shaped non-circular hole in the proximate end of handle 92 so that handle 92 may drivingly rotate spindle 72. A nut 94 or other suitable threaded fastener removably attaches handle 92 to the second end of the spindle 72 as illustrated in FIG. 3. Of course, a bolt cooperating with an internally tapped bore in the in the spindle could alternatively be used as could other conventional methods for attaching a handle to the spindle.

In the inlet valve assembly 54 embodiment illustrated in FIG. 3, the first body section 68 is removably attached to tankless water heater inlet 22 by a coupling formed by a nut 96 which cooperates with a threaded outer peripheral portion of the first body section 58 as illustrated in FIG. 3. A seal 98 interposed between the end of the cold water inlet and the first body section insures a fluid tight seal. Other conventional methods of removably attaching the inlet valve assembly 54 to the hot water heater 20 can be utilized as may well be known to those skilled in the art. For example, a tubular crimp connection can be utilized such as crimp connector 99 shown on the second body section 60 for attaching the inlet valve assembly to cold water inlet pipe 26.

Figure 4:
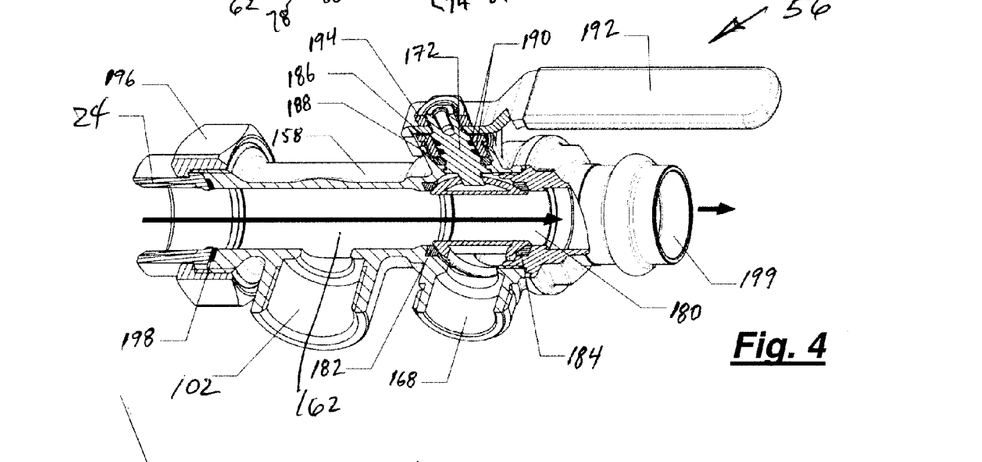
FIG. 4 is a partially cutaway perspective view of an outlet valve assembly of the present invention.

Outlet valve assembly 56 shown in FIG. 4 is very similar in construction to inlet valve assembly 54 of FIG. 3. For the purposes of simplicity, the component parts making up outlet valve assembly 56 are given 100 series reference numbers. The only difference between outlet valve assembly 56 and inlet valve assembly 54 is the addition of a T-connector 102 formed in the first body section 158 and communicating with the first tubular portion 162. T-connector 102 is intended to provide a compact mounting location for a pressure relief valve 50. The T-connector 102 is preferably formed with an internal pipe thread for receiving a pressure relief valve 50 having a male threaded connector. Of course, external threads or an alternative coupling system may be employed.

Figure 5:
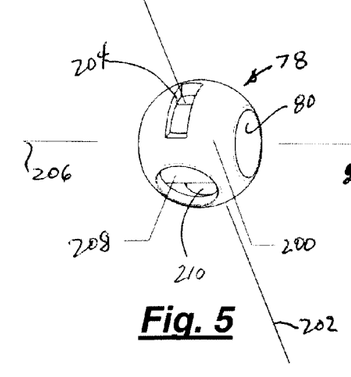
FIG. 5 is a perspective view of the spherical ball.
Figure 6:
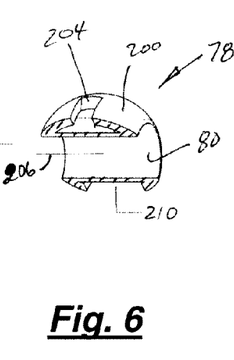
FIG. 6 is a longitudinal cross-section of the spherical ball.
Figure 7:
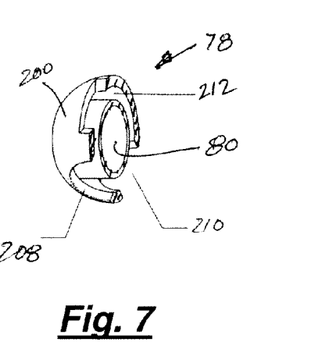
FIG. 7 is a transverse cross-section of the spherical ball.

Both the inlet valve assembly 54 and outlet valve assembly 56 have a ball valve 78 and 178 of similar construction. A representative one of the ball valve 78 is shown in FIGS. 5-7. Ball valve 78 is a generally spherical outer surface 200. Ball valve 78 is sized to fit within ball cavity 66 for rotation about a spindle axis 202. One axial end of the ball valve is provided with a notch 204 sized to receiving a non-circular first end 74 of the spindle. Extending centrally through the ball valve aligned along a primary axis 206 perpendicular to the spindle axis 202 is a primary elongate passageway 80. When ball valve 78 is oriented in the open position as shown in FIG. 3, primary elongate passage 80 is coaxially aligned with first and second tubular passage portion 62 and 64. When the ball valve is in the open position, first and second annular seals 82 and 84 cooperate with the spherical outer surface 200 of the ball valve in the region immediately outboard of primary elongate passage 80. The primary passageway is also illustrated in FIG. 6 which is a cross-sectional view taken along a plane parallel to the primary axis 206 and cross-sectional view in FIG. 7 which is taken along a plane perpendicular to primary axis 208 through the center of the ball valve 78.

Ball valve 78 is further provided with an internal bypass port 208 which the ball valve 78 is rotated to the bypass position as aligned with first tubular passage portion 62. The internal bypass port is preferably isolated from primary elongate passage 80 allowing fluid to flow through the bypass port into the ball cavity which generally surrounds ball valve 78. Auxiliary inlet/outlet 68 is coupled to the ball cavity 66, therefore, when handle 92 and the ball valve 78 are rotated to thy bypass position as shown in FIG. 8, first tubular passage portion 62 in the first body section 58, is coupled to the auxiliary inlet/outlet 68 allowing fluid to freely flow therebetween. In the preferred embodiment, internal bypass port 208 ends in an annular opening sufficiently small to fit within first annular seal 82 so that first annular seal engages outer spherical surface 200 of ball valve 78. When in the bypass position, second annular seal 84 engages the spherical annular surface of ball valve 78 so that both the first and second annular seals 82 and 84 are maintained in a compressed state.

Figure 10:
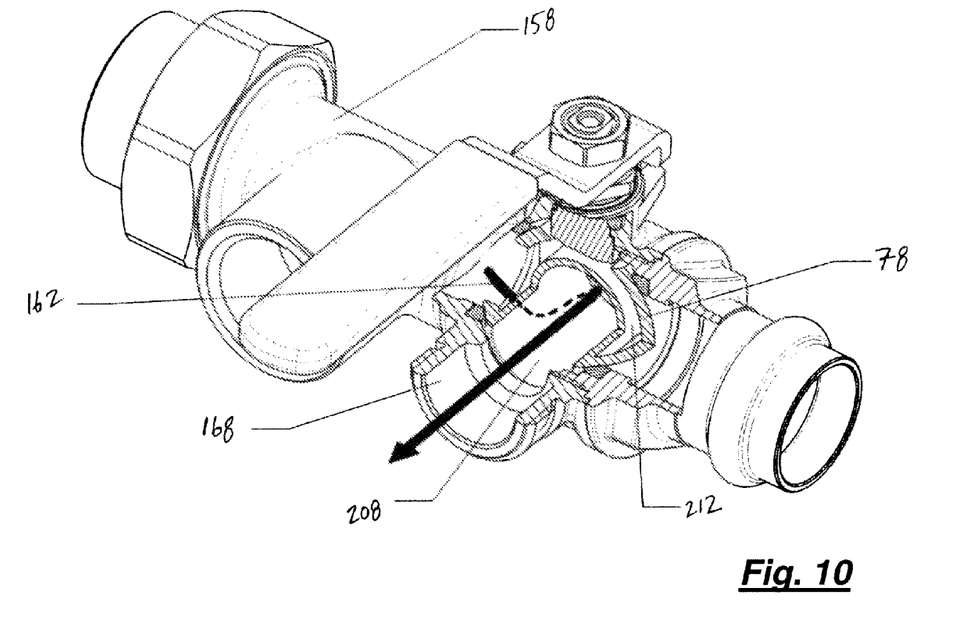
FIG. 10 is a partially cutaway perspective view of the outlet valve assembly in the bypass position.
Figure 11:
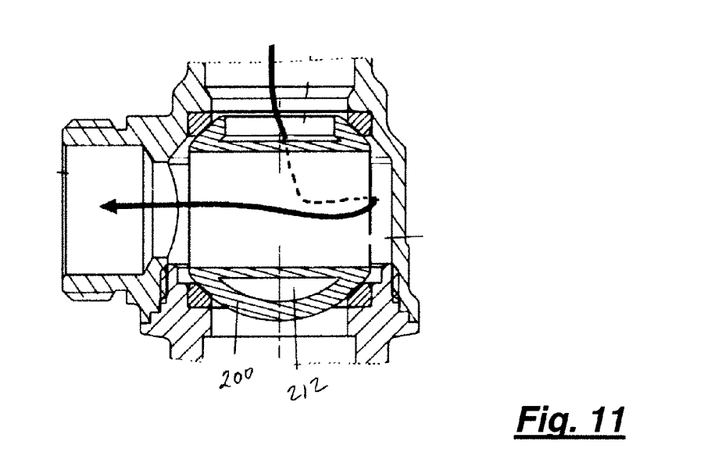
FIG. 11 is a cross-sectional side elevational view of the outlet valve assembly in the bypass position.

Internal bypass port 208 as previously described, has passageway opening extending orthogonal to spindle axis 202 for communication with first tubular passage portion 62 when ball valve 78 is rotated to the bypass position. Fluid entering the internal bypass port 208 may exit into the ball cavity 66 via axial opening 210. Alternatively, rather than having two separate discrete openings in the internal bypass port, an elongate channel can be utilized, however, this design is not preferred when elastomeric seals are used since the seals will not be maintained uniformly compressed when the valve is in the bypass position which could result in premature seal failure or increased valve friction. The flow path interconnecting the first tubular passage portion 62 and the auxiliary inlet/outlet 68 when the ball valve is in the bypass position is further shown in FIGS. 8 and 9. FIGS. 9 and 10 illustrate the flow path and outlet valve assembly 56 which from a ball valve function is identical to the inlet valve assembly 54.

Figure 12:
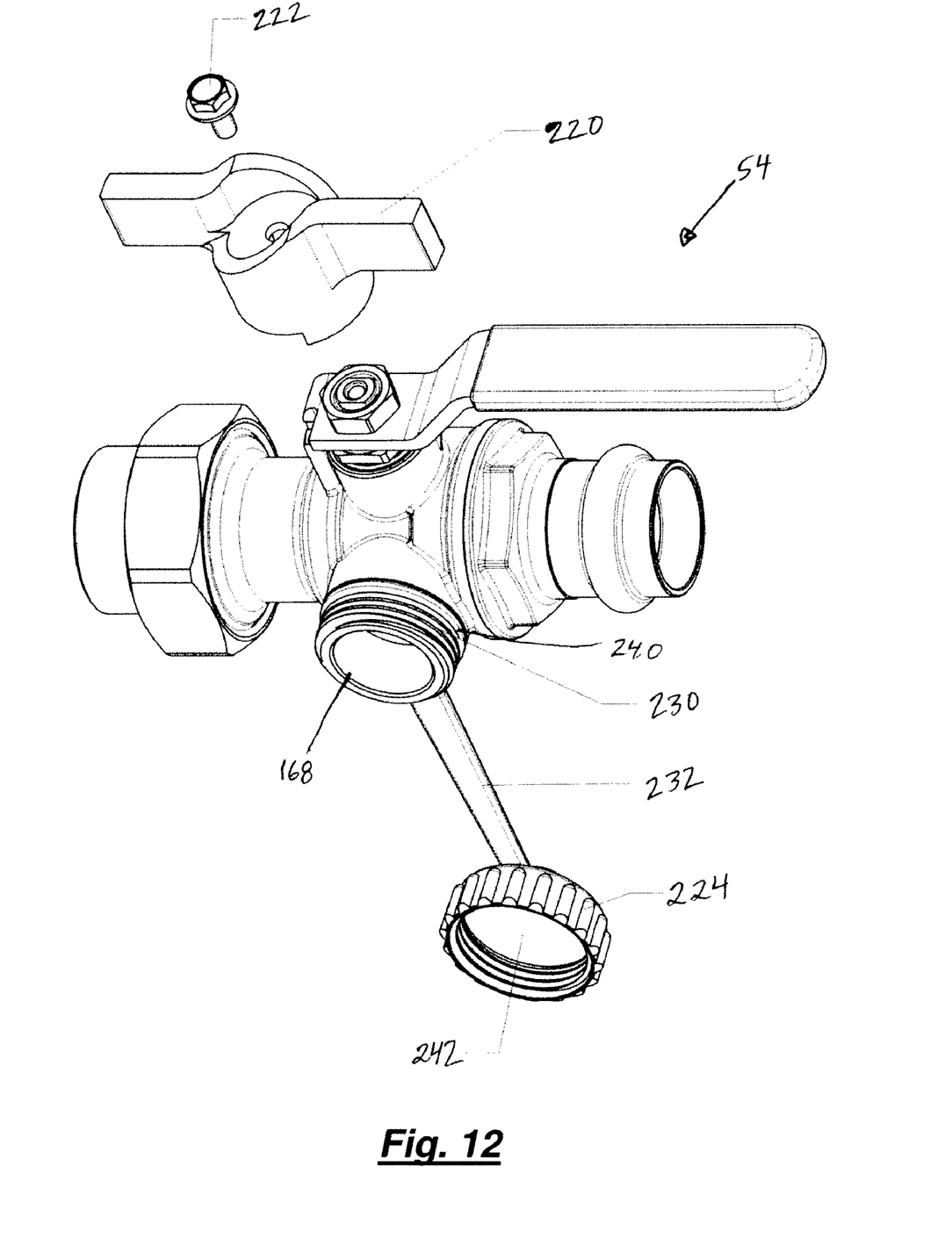
FIG. 12 is a perspective view of the inlet valve assembly illustrating an alternative handle configuration.
Figure 13:
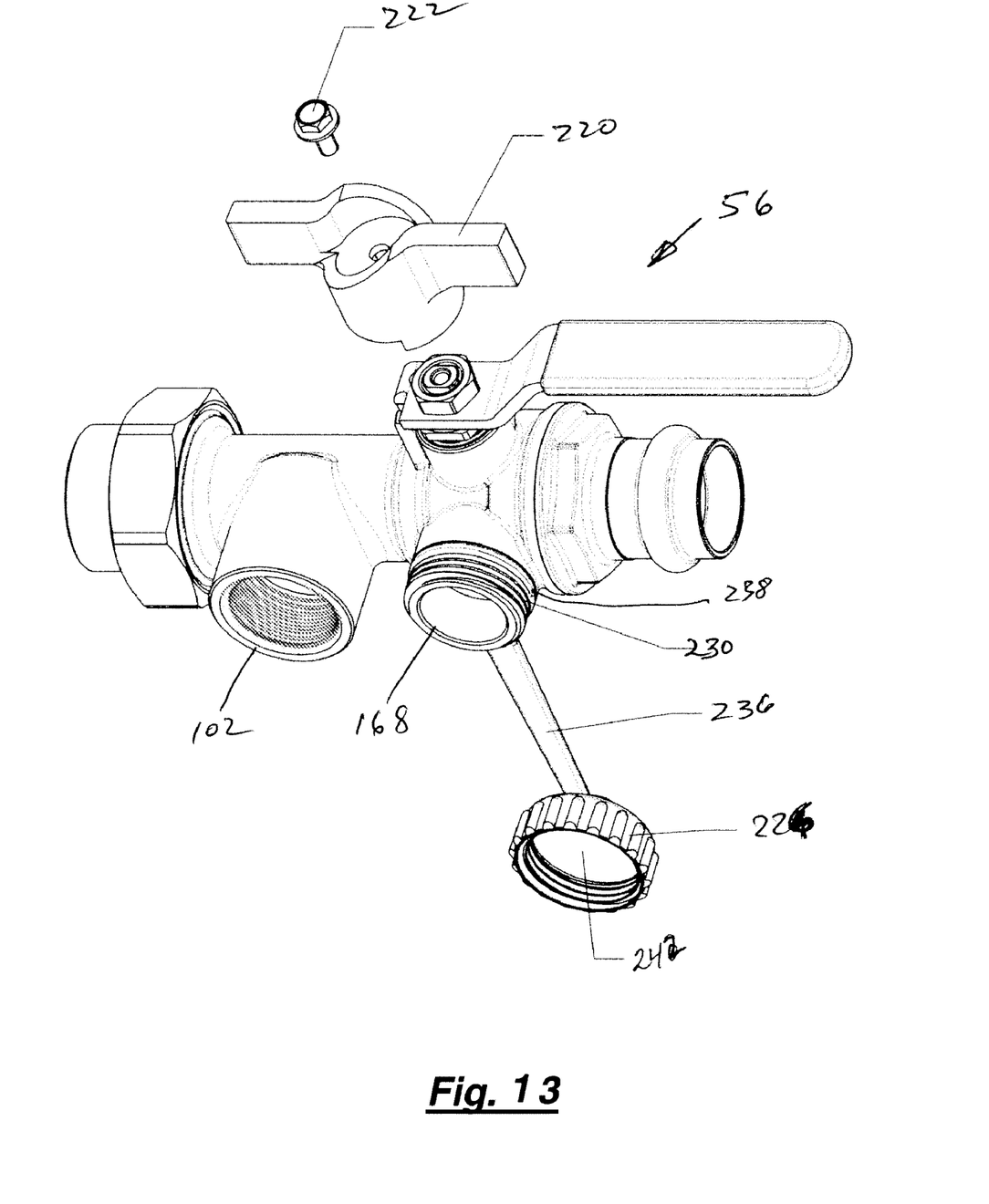
FIG. 13 is a perspective view of the outlet valve assembly illustrating an alternative handle configuration.

FIGS. 12 and 13 are perspective views of the inlet valve assembly and outlet valve assembly 54 and 56 illustrating an alternative handle construction 220 and an alternative fastener bolt 222. FIGS. 12 and 13 further illustrate caps 224 and 226 which respectively cooperate with the threaded exterior periphery 228 and 230 of inlet/outlet 68 and 168. Caps 224 and 226 are preferably connected to the valve assembly by a tether 232 and a collar ring 234 which press fits over threads 228 on the inlet/outlet 68. Similarly, outlet valve 56 is provided with a tether 236 having a collar ring 238 cooperating with the threaded exterior 230 of auxiliary inlet/outlet 168. Caps 224 and 226 are pivotally attached to the tether 232 and 236 by a conventional swivel connection. Ideally, caps 224 and 226 are provided with an internal seal 238 and 240 to provide a leak tight fluid connection when the cap is installed in the inlet/outlet.

When in use, inlet and outlet valve assemblies 54 and 56 would be normally oriented in the open position allowing water to freely flow therethrough when used in conjunction with a tankless hot water heater. When it is desired to flush the system, the handles and associated ball valves are rotated to the bypass position by rotating the handle a quarter turn about the spindle axis. The tankless water heater 20 is then isolated from both the inlet supply line 26 and the outlet supply line 38. Caps 224 and 226 are removed from inlet/outlets 68 and 168 and the water within the tankless hot water heater 20 is allowed to drain. If desired, hose couplings can be attached to the inlet/outlet and the system flushed with the water or suitable solvent to scale.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A pair of valve assemblies for use with a tankless water heater having a cold water inlet and a hot water outlet, the pair of valve of assemblies comprising, an inlet valve assembly connecting a cold water inlet pipe to the tankless water heater inlet and an outlet valve assembly connecting the hot water outlet of a tankless water heater to a hot water outlet pipe, each of the hot and cold water valve assemblies comprising;

a valve body formed of at least a first and second body section, each having an elongate tubular passageway portion which cooperate with a ball cavity formed therebetween when one of the body sections defines an auxiliary inlet/outlet in communication with the ball cavity and a tubular spindle flange communicating with the ball cavity;

an elongate spindle sealingly mounted within the spindle flange for limited rotation between an open position and a bypass position, the spindle having a first end extending toward the ball cavity and a second end oriented distally therefrom; and a ball valve oriented within the ball cavity affixed relative to the spindle for rotation therewith between a closed position and a bypass position, a ball valve having a primary elongate passageway extending orthogonally to an axis of ball rotation, the primary elongate passageway being generally aligned with the tubular passageway portions and the feld body sections when the ball valve is in the open position, the ball valve further having an internal bypass port which is aligned with the passageway portion and the first body section when the ball valve is in the bypass position to interconnect the first body section tubular passageway with the auxiliary inlet/outlet while isolating the second body section tubular passageway from the ball cavity;

wherein the first body section of each of the hot water and cold water valve assemblies is respectively connected to the tankless water heater, cold water inlet and hot water outlet so that when the valves are in the normally open position, water flows from the cold water inlet pipe through the cold water valve assembly through the tankless water heater and out through the hot water valve assembly to the hot water pipe and when the ball valves, the hot water and cold valve assemblies are moved to the bypass position, the tankless water heaters are isolated from the cold water inlet and hot water outlet pipes and in communication with the auxiliary inlet/outlets of the hot and cold water valve assemblies.

2. The pair of valve assemblies of claim 1 wherein at least one of the valve assemblies is provided with a pressure relief port in communication with an elongate tubular passage and one of the body sections.

3. The valve assembly of claim 1 further comprising a pair of annular seals oriented at the intersection of the two tubular passage portions and the ball cavity to sealingly join the two body sections to the ball valve.

4. The valve assembly of claim 3 wherein one of the annular seals engages the ball valve peripheral surface extending sealingly about the bypass port where the ball valve is oriented in the bypass position and the other of the annular seals engages the ball valve peripheral surface to isolate the adjacent tubular passage portion of the ball cavity.

5. The valve assembly of claim 4 wherein the bypass port within the ball valve has a generally radial opening for cooperating with a tubular passage portion and an auxiliary opening for cooperating with the ball cavity and the auxiliary inlet/outlet which communicates therewith.

* * * * *

UNITED STATES PATENT AND TRADEMARK OFFICE
CERTIFICATE OF CORRECTION

PATENT NO. : 7,762,280 B2  
APPLICATION NO. : 11/737894  
DATED : July 27, 2010  
INVENTOR(S) : Giulio Pettinaroli et al.

Page 1 of 1

It is certified that error appears in the above-identified patent and that said Letters Patent is hereby corrected as shown below:

In the Claims

Column 6, Line 16, Claim 1:

Delete "feld".

Signed and Sealed this
Sixteenth Day of September, 2014

Michelle K. Lee
*Deputy Director of the United States Patent and Trademark Office*